(12) United States Patent
Shen (10) Patent No.: US 9,543,751 B2
(45) Date of Patent: Jan. 10, 2017

(54) SELF-POWERED DC SOLID STATE CIRCUIT BREAKERS

(71) Applicant: Zheng John Shen, Chicago, IL (US)

(72) Inventor: Zheng John Shen, Chicago, IL (US)

(73) Assignee: Illinois Institute of Technology, Chicago, IL (US)

(*) Notice: Subject to any disclaimer, the term of this patent is extended or adjusted under 35 U.S.C. 154(b) by 12 days.

(21) Appl. No.: 14/669,515

(22) Filed: Mar. 26, 2015

(65) Prior Publication Data

US 2015/0280417 A1 Oct. 1, 2015

Related U.S. Application Data

(60) Provisional application No. 61/971,326, filed on Mar. 27, 2014.

(51) Int. Cl.
 *H02H 3/08* (2006.01)
 *H02H 3/087* (2006.01)
 *H02H 1/06* (2006.01)

(52) U.S. Cl.
 CPC ............. *H02H 3/087* (2013.01); *H02H 1/063* (2013.01)

(58) Field of Classification Search
 USPC ........................................... 361/100
 See application file for complete search history.

(56) References Cited

U.S. PATENT DOCUMENTS

| 5,164,872 | A * | 11/1992 | Howell | H01H 9/548 361/11 |
|---|---|---|---|---|
| 2010/0277006 | A1* | 11/2010 | Urciuoli | H01L 29/8083 307/130 |
| 2011/0121883 | A1* | 5/2011 | Veliadis | H01L 27/098 327/430 |
| 2012/0161208 | A1* | 6/2012 | Veliadis | H01L 29/1608 257/265 |
| 2012/0299393 | A1* | 11/2012 | Hafner | H01H 9/542 307/113 |
| 2013/0009491 | A1* | 1/2013 | Hafner | H02M 1/092 307/113 |
| 2013/0154391 | A1 | 6/2013 | Urciuoli | |
| 2014/0029152 | A1 | 1/2014 | Mazzola et al. | |
| 2014/0268465 | A1* | 9/2014 | Veliadis | H02H 1/0023 361/101 |
| 2015/0280417 | A1* | 10/2015 | Shen | H02H 3/087 361/100 |
| 2015/0372473 | A1* | 12/2015 | Wang | H01H 71/1045 361/57 |

OTHER PUBLICATIONS

Salomonsson, D. et al., "Low-Voltage DC Distribution System for Commercial Power Systems With Sensitve Electronic Loads", IEEE Trans. Power Delivery, Jul. 2007, v. 22 No. 3, pp. 1620-1626.
Kempkes, K. et al., "Solid-State Circuit Breakers for Medium Voltage DC Power", IEEE Electric Ship Techn. Symp. (ESTS), 2011, pp. 254-257.
Sato, Y. et al., "SiC-SIT Circuit Breakers With Controllable Interruption Voltage for 400-V DC Distribution System", IEEE Tran. Power Electronics, May 2014, v. 29 No. 5, pp. 2597-2605.

* cited by examiner

*Primary Examiner* — Ronald W Leja
(74) *Attorney, Agent, or Firm* — Pauley Erickson & Kottis (57) ABSTRACT

A solid-state circuit breaker for a DC power system which may operate unidirectional and bidirectional and does not require an external power supply to provide current interruption protection during an event of a short circuit fault.

18 Claims, 9 Drawing Sheets

SELF-POWERED DC SOLID STATE CIRCUIT BREAKERS

FIELD OF THE INVENTION

The present invention relates in general to solid-state circuit breakers and, more particularly, to a family of semiconductor switches with self-powered auxiliary circuits that interrupt short circuit fault currents in DC power systems.

BACKGROUND OF THE INVENTION

DC power systems are gaining more popularity with increased DC loads (IT equipment, variable speed motor drives, LED lighting, etc.), renewable power generation (photovoltaic, wind, etc.), and distributed energy resources (batteries, fuel cells, microturbines, small gas generators). This is especially true for data centers, residential/commercial buildings, shipboard power systems, and high voltage DC transmission systems (HVDC), for example as described in "Low-Voltage DC Distribution System for Commercial Power Systems With Sensitive Electronic Loads," D. Salomonsson and A. Sannino, IEEE Trans. Power Delivery, Vol. 22, No. 3, pp. 1620-1626, July 2007. DC power architectures improve energy efficiency by eliminating several conversion stages between AC/DC required in AC power systems. However, one major technical challenge for DC systems is to provide circuit breaker (CB) protection in the event of short circuit faults.

Electromechanical DC circuit breaker products are available from companies like ABB, Eaton, and Schneider Electric, but suffer from slow action, typically with a response time of 30-100 milliseconds, and limited lifetime due to arcing. DC solid-state circuit breaker (SSCB) solutions were also developed to provide a much faster response time, typically with a response time of tens to hundreds of microseconds, and a much longer lifetime. Power semiconductor switching devices such as silicon IGBTs or thyristors, and more recently silicon carbide (SiC) JEFTs (Junction Effect Transistors) or SITs (Static Induction Transistors) are often employed in these solutions. For further reference see: "Solid-state circuit breakers for Medium Voltage DC power," Kempkes, M., Roth, I., Gaudreau, M., IEEE Electric Ship Technologies Symposium (ESTS), 2011, Page(s) 254-257; U.S. Patent Application Publication 2014/0029152 A1; U.S. Patent Application Publication 2013/0154391; and "SiC-SIT Circuit Breakers With Controllable Interruption Voltage for 400-V DC Distribution Systems," Y. Sato et al., IEEE Tran. Power Electronics, Vol. 29, No. 5, May 2014, Page(s):2597-2605.

One challenge of these "smart" SSCBs is that they typically rely on complex and expensive over-current sensing circuitry, signal processing and data communication functions, and one or more external power supplies, which may or may not be available during the same short circuit fault event. A simple, stand-alone, two-terminal SSCB as reliable as the conventional electromechanical AC circuit breaker without requiring external power supply is highly desirable.

An objective of this invention is to develop a family of unidirectional and bidirectional SSCBs that do not require an external power supply to provide current interruption protection during the event of a short circuit fault in a DC power system. All known solutions rely on sensing over-current through a switch during a short circuit fault event and require one or more separate power supply to power up the control electronics of the SSBC. A preferred embodiment of this invention does not sense an over-current through a switch but rather a voltage across the switch to detect a short circuit fault. The sudden increase in the voltage across the switch, "desaturation," provides the power to turn and hold off the switch until the short circuit condition is removed. In a preferred embodiment, the stand-alone SSCB of this invention does not require or draw any power in the conduction state for normal operation. The stand-alone SSCB uses a very small amount of leakage power to cut off a fault current when a short circuit condition is present. The power is drawn from the high voltage built across the switch using a DC-DC converter. For example, one or more isolated low wattage flyback DC-DC converters can be used for this purpose. These DC-DC converters must offer very fast dynamic response but relatively relaxed efficiency and voltage regulation requirements. This invention is simpler and more reliable than the prior art. In addition, the embodiments of the invention require a smaller die size of the core semiconductor switches than the prior art, resulting in considerable cost reduction.

SUMMARY OF THE INVENTION

The present invention comprises a solid-state circuit breaker for a DC power system. The invention comprises multiple embodiments which may be designed to operate unidirectional and bidirectional and do not require an external power supply to provide current interruption protection during an event of a short circuit fault. This invention may be designed with silicon and/or wide bandgap (WBG) semiconductor switches, with the understanding that WBG semiconductors, such as SiC and GaN, are more appropriate for voltage ratings over 300 volts.

In an embodiment of this invention, the solid-state circuit breaker of the invention includes a solid-state switch and a voltage sensing and power supply circuit that can be connected between a power supply and a load. The voltage sensing and power supply circuit preferably includes a DC-DC converter and a voltage sensing element. When the load is not shorted, the solid-state switch conducts a normal current. However, when the load is shorted, a voltage across the solid-state switch increases rapidly causing a voltage change across the voltage sensing element and a large reverse biasing voltage through the DC-DC converter, turning off the solid-state switch and providing current interruption protection.

In one embodiment of this invention, the present invention is a unidirectional SSCB comprising a normally-on asymmetric semiconductor JFET, a voltage sensing and power supply circuit having a blocking diode, a first resistor, a second resistor, an isolated DC-DC converter, a capacitor, and a metal-oxide varistor (MOV). The JFET includes a drain, a source, and a gate terminal, wherein a main current flows from the drain to the source. The voltage sensing and power supply circuit, the capacitor, and the MOV are connected between the drain and the source of the JEFT. The input terminals of the isolated DC-DC converter are connected across the second resistor of the voltage sensing and power supply circuit. The output terminals of the isolated DC-DC converter are connected between the source and gate of the JFET through a second blocking diode.

In an alternative embodiment, the unidirectional SSCB of this invention comprises a normally-on asymmetric gallium nitride (GaN) high electron mobility transistor (HEMT), a voltage sensing and power supply circuit having a blocking diode, a first resistor, a second resistor, an isolated DC-DC converter, a capacitor, and a metal-oxide varistor (MOV).

The HEMT includes a drain, a source, and a gate terminal with a main current flowing from the drain to the source. The voltage sensing and power supply circuit, the capacitor, and the MOV are connected between the drain and source of the HEMT. The input terminals of the isolated DC-DC converter are connected across the second resistor of the voltage sensing and power supply circuit. Output terminals of the isolated DC-DC converter are connected between the source and gate of the HMET through a second blocking diode.

In another embodiment, the present invention is a bidirectional SSCB comprising a first and second asymmetrical normally-on JFETs, a first and second voltage sensing and power supply circuits each having a blocking diode, a first resistor, a second resistor, a first isolated DC-DC converter and a second isolated DC-DC converter, a capacitor, and a metal-oxide varistor (MOV). Each of the JFETs includes a drain, a source, and a gate terminal. The drain terminals of the two JFETs are connected together to form a bidirectional switch with the main current flowing from the source of one of the JFETs to the source of the other JFET. The two voltage sensing and power supply circuits, the capacitor, and the MOV are connected between the source terminals of the two JEFTs. The input terminals of the first isolated DC-DC converter are connected across the second resistor of the first voltage sensing and power supply circuit. The output terminals of the first isolated DC-DC converter are connected between the source and gate of the first JFET through a third blocking diode. The input terminals of the second isolated DC-DC converter are connected across the second resistor of the second voltage sensing and power supply circuit. The output terminals of the second isolated DC-DC converter are connected between the source and gate of the second JFET through a third blocking diode.

In another embodiment, this invention is a bidirectional SSCB comprising first and second asymmetrical normally-on GaN HEMTs, a first and second voltage sensing and power supply circuits each having a blocking diode and a first resistor, a second resistor, a first isolated DC-DC converters, a second isolated DC-DC converter, a capacitor, and a metal-oxide varistor (MOV). Each of the two HEMTs has a drain, source, and gate terminal. The drain terminals of the two HEMTs are connected together to form a bidirectional switch with the main current flowing from the source of the first HEMT to the source of the second HEMT or vice versa. The two voltage sensing and power supply circuits, the capacitor, and the MOV are connected between the source terminals of the two HEMTs. The input terminals of the first isolated DC-DC converter are connected across the second resistor of the first voltage sensing and power supply circuit. The output terminals of the first isolated. DC-DC converter are connected between the source and gate of the second HEMT through a third blocking diode. The input terminals of the second isolated DC-DC converter are connected across the second resistor of the second voltage sensing and power supply circuit. The output terminals of the second isolated DC-DC converter are connected between the source and gate of the first HEMT through a fourth blocking diode.

In another embodiment, the present invention is a bidirectional SSCB comprising a symmetrical normally-on JFET, a first blocking diode and a second blocking diode, a voltage sensing and power supply circuit having a first resistor, a second resistor and a third resistor, and a diode bridge, an isolated DC-DC converter, a capacitor, and a metal-oxide varistor (MOV). The symmetrical JFET has a drain, a source, and a gate region with a main current flowing between the source and the drain of the JFET. The voltage sensing and power supply circuit, the capacitor, and the MOV are connected between the source and the drain of the JEFT. The input terminals of the isolated DC-DC converter are connected across the second resistor of the voltage sensing and power supply circuit through the diode bridge. A negative output terminal of the isolated DC-DC converter is connected to the gate of the JFET. A positive output terminal of the isolated DC-DC converter is connected to a common anode of the first and second blocking diodes. A cathode of the first blocking diode is connected to the source of the JFET. The cathode of the second blocking diode is connected to the drain of the JFET.

In another embodiment, the present invention is a bidirectional SSCB comprising a symmetrical normally-on HEMT, a first blocking diode, a second blocking diode, a voltage sensing and power supply circuit having a first resistor, a second resistor, a third resistor and a diode bridge, an isolated DC-DC converter, a capacitor, and a metal-oxide varistor (MOV). The symmetrical HEMT has a drain, a source, and a gate region with a main current flowing between the source and the drain of the HEMT. The voltage sensing and power supply circuit, the capacitor, and the MOV are connected between the source and the drain of the HEMT. The input terminals of the isolated DC-DC converter are connected across the second resistor of the voltage sensing and power supply circuit through the diode bridge. A negative output terminal of the isolated DC-DC converter is connected to the gate of the HEMT. A positive output terminal of the isolated DC-DC converter is connected to a common anode of the first and second blocking diodes. A cathode of the first blocking diode is connected to the source of the HEMT. A cathode of the second blocking diode is connected to the drain of the HEMT.

In another embodiment, the present invention is a bidirectional SSCB comprising a symmetrical four-terminal bidirectional normally-on JFET switch, a first and second voltage sensing and power supply circuits each having a blocking diode and first and second resistors, first and second isolated DC-DC converters, a capacitor, and a metal-oxide varistor (MOV). The symmetrical JFET switch has first and second source, first and second gate regions. The main current flows between the first and second sources of the bidirectional JFET switch. The two voltage sensing and power supply circuits, the capacitor, and the MOV are connected between the two sources of the JEFT switch. Input terminals of the first isolated DC-DC converter are connected across the second resistor of the first voltage sensing and power supply circuit. Output terminals of the first isolated DC-DC converter are connected between the first source and the first gate of the JFET through a third blocking diode. The input terminals of the second isolated DC-DC converter are connected across the second resistor of the second voltage sensing and power supply circuit. The output terminals of the second isolated DC-DC converter are connected between the second source and the second gate of the JFET through a fourth blocking diode.

In another embodiment, the present invention is a bidirectional SSCB comprising a symmetrical four-terminal bidirectional normally-on HEMT, a first and a second voltage sensing and power supply circuits each having a blocking diode, a first resistor and a second resistor, a first and second isolated DC-DC converters, a capacitor, and a metal-oxide varistor (MOV). The symmetrical HEMT has a first and a second source, a first and a second gate region. The main current flows between the two sources of the bidirectional HEMT switch. The two voltage sensing and power supply circuits, the capacitor, and the MOV are connected between the two sources of the HEMT. The input terminals of the first isolated DC-DC converter are connected across the second resistor of the first voltage sensing and power supply circuit. The output terminals of the first isolated DC-DC converter are connected between the first source and first gate of the HEMT through a third blocking diode. The input terminals of the second isolated DC-DC converter are connected across the second resistor of the second voltage sensing and power supply circuit. The output terminals of the second isolated DC-DC converter are connected between the second source and the second gate of the HEMT through a fourth blocking diode.

DETAILED DESCRIPTION OF THE INVENTION

A solid-state DC circuit breaker of this invention is connected between a voltage source and load. The solid-state circuit breaker preferably includes a solid-state switch and a voltage sensing and power supply circuit including a voltage sensing element and a DC-DC converter. In operation, when a short occurs between the voltage source and the load, the voltage sensing element generates a reverse biasing voltage through the DC-DC converter, turning off the solid-state switch and protecting the circuit.

Figure 1:
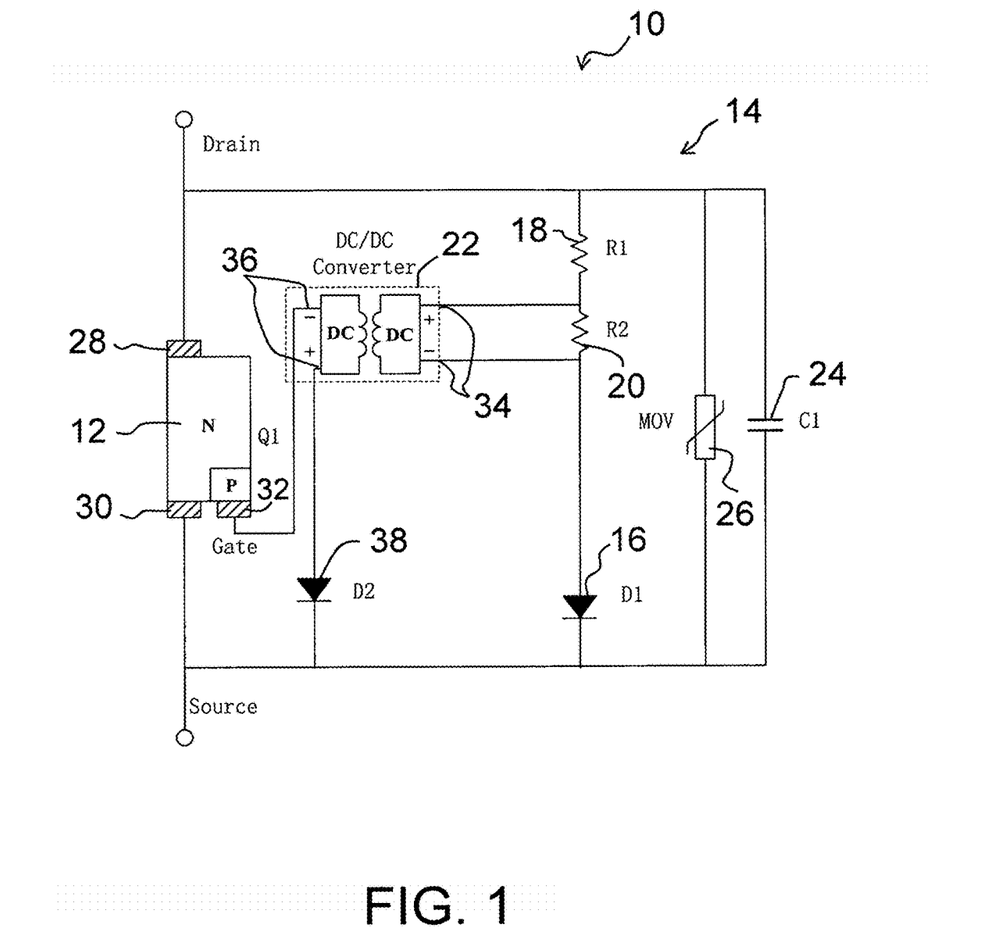
FIG. 1 shows a unidirectional solid-state circuit breaker including an asymmetrical normally-on JFET according to an embodiment of this invention.

FIG. 1 illustrates a unidirectional solid-state circuit breaker (SSBC) 10 using an asymmetrical normally-on JFET 12 according to one embodiment of this invention. The unidirectional SSCB 10 comprises a normally-on asymmetric semiconductor JFET (Q1) 12 and a voltage sensing and power supply circuit 14. The voltage sensing and power supply circuit 14 includes a blocking diode (D1) 16 and a first resistor (R1) 18 and a second resistor (R2) 20, an isolated DC-DC converter 22, a capacitor (C1) 24, and a metal-oxide varistor (MOV) 26. The JFET (Q1) 12 has a drain 28, a source 30, and a gate terminal 32 with the main current flowing from the drain 28 to the source 30. The voltage sensing and power supply circuit 14, the capacitor (C1) 24, and the MOV 26 are connected between the drain 28 and the source 30 of the JEFT Q1. Input terminals 34 of the isolated DC-DC converter 22 are connected across the second resistor (R2) 20 of the voltage sensing and power supply circuit 14. Output terminals 36 of the isolated DC-DC converter 22 are connected between the source 30 and the gate 32 of the JFET 12 through a second blocking diode (D2) 38. The unidirectional SSCB 10 of this invention is preferably used in a DC power system (not shown) with the drain 28 of the JFET (Q1) 12 connected to a power supply (not shown), and the source 30 of JFET (Q1) 12 connected to a load element (not shown). When the normally-on JFET (Q1) 12 conducts a normal load current from the drain 28 to the source 30, a drain-source voltage of the JFET (Q1) 12 and a voltage across the second resistor (R2) 20 are both very small. An input voltage and an output voltage of the isolated DC/DC converter are also negligible. Therefore, there is no reverse biasing voltage applied between the gate 32 and source 30. The JFET (Q1) 12 remains in an on state. When the load is shorted, the voltage between the drain 28 and the source 30 of the JFET (Q1) 12 increases rapidly, causing a large voltage built across the second resistor (R2) 20 and leading to a large reverse biasing voltage between the gate 32 and source 30 of the JFET (Q1) 12. The normally-on JFET (Q1) 12 will turn off and block currents from the power supply with a large negative gate-source biasing voltage, typically 10-40 volts, and thus provide protection against short circuit faults. The MOV 26 is used to clamp a voltage spike between the drain 28 and the source 30 of the JFET (Q1) 12 caused by a parasitic inductance in the circuit when a fault current is interrupted.

Figure 2:
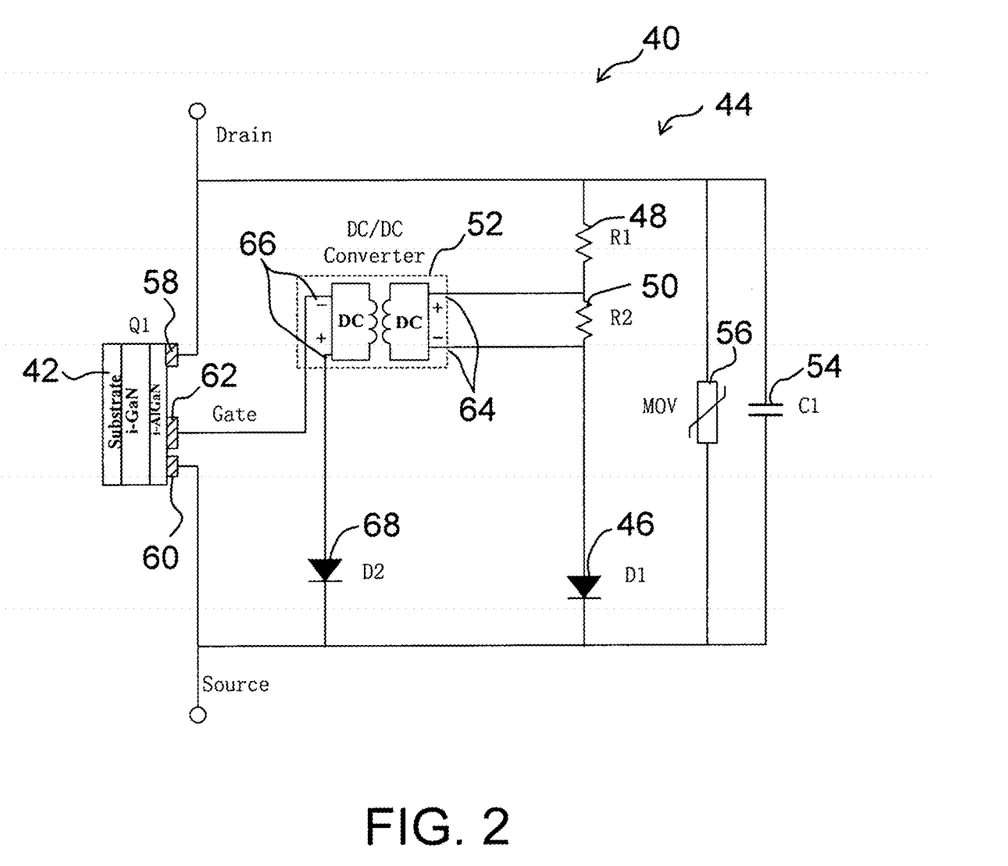
FIG. 2 shows a unidirectional solid-state circuit breaker including an asymmetrical normally-on gallium nitride (GaN) High Electron Mobility Transistor (HEMT) according to an embodiment of this invention.

FIG. 2 illustrates a unidirectional solid-state circuit breaker 40 using an asymmetrical normally-on gallium nitride (GaN) High Electron Mobility Transistor (HEMT) 42 according to one embodiment of this invention. The unidirectional SSCB 40 comprises the normally-on asymmetric semiconductor HEMT (Q1) 42, a voltage sensing and power supply circuit 44 having a blocking diode (D1) 46, a first resistor (R1) 48 and a second resistor (R2) 50, an isolated DC-DC converter 52, a capacitor (C1) 54, and a metal-oxide varistor (MOV) 56. The HEMT (Q1) 42 includes a drain 58, a source 60, and a gate terminal 62 with a main current flowing from the drain 58 to the source 60. The voltage sensing and power supply circuit 44, the capacitor (C1) 54, and the MOV 56 are connected between the drain 58 and the source 60 of the HEMT (Q1) 42. Input terminals 64 of the isolated DC-DC converter 52 are connected across the second resistor (R2) 50 of the voltage sensing and power supply circuit 44. Output terminals 66 of the isolated. DC-DC converter 52 are connected between the source 60 and the gate 62 of the HEMT 42 through a second blocking diode (D2) 68. The unidirectional SSCB 40 is preferably used in a DC power system with the drain 58 of Q1 connected to a power supply, and the source 60 of Q1 connected to a load element. When the normally-on HEMT (Q1) 42 conducts a normal load current from the drain 58 to the source 60, a drain-source voltage of Q1 and a voltage across the second resistor (R2) 50 are both very small. An input voltage and an output voltage of the isolated DC/DC converter 52 are also negligible. Therefore, there is no reverse biasing voltage applied between the gate 62 and the source 60 of the HEMT (Q1) 42. The HEMT (Q1) 42 remains in an on state. When the load is shorted, the voltage between the drain 58 and the source 60 of the HEMT (Q1) 42 increases rapidly, causing a large voltage built across the second resistor (R2) 50 and leading to a large reverse biasing voltage between the gate 62 and the source 60 of the HEMT (Q1) 42. The normally-on HEMT (Q1) 42 will turn off and block currents from a power supply with a large negative gate-source biasing voltage, and thus provide protection against short circuit faults. The MOV 56 is used to clamp a voltage spike between the drain 58 and the source 60 of the HEMT (Q1) 42 caused by a parasitic inductance in the circuit when the fault current is interrupted.

Figure 3:
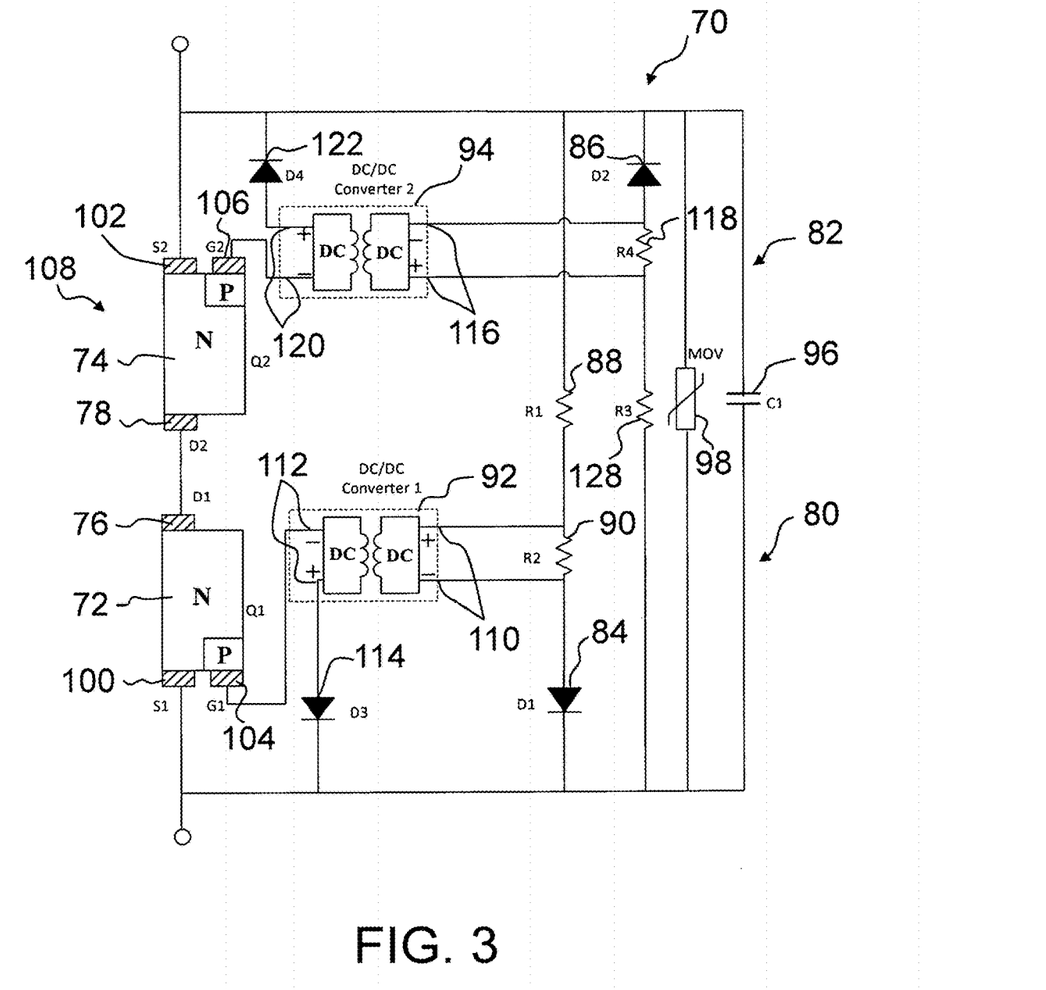
FIG. 3 shows a bidirectional solid-state circuit breaker including a plurality of asymmetrical normally-on JFETs with drain terminals connected according to an embodiment of this invention.

FIG. 3 illustrates a bidirectional solid-state circuit breaker 70 according to one embodiment of this invention comprising two asymmetrical normally-on JFETs 72, 74 with their drain terminals 76, 78 connected together. The bidirectional SSCB 70 comprising first and second asymmetrical normally-on JFETs (Q1) 72 and (Q2) 74, first and second voltage sensing and power supply circuits 80, 82 each having a blocking diode 84, 86 and a first resistor 88, 128 and a second resistors 90, 118, first isolated DC-DC converters 92 and second isolated DC-DC converter 94, a capacitor (C1) 96, and a metal-oxide varistor (MOV) 98. Each of the two JFETs 72, 74 includes a drain 76, 78, a source 100, 102, and a gate terminal 104, 106. The drain terminals 76, 78 of the JFETs (Q1, Q2) 76, 78 are connected together to form a bidirectional switch 108 with a main current flowing from the source 102 of the second JFET (Q2) 74 to the source 100 of the first JFET (Q1) 72 or vice versa. The two voltage sensing and power supply circuits 80, 82, the capacitor (C1) 96, and the MOV 98 are connected between the source terminals 100, 102 of the JFETs (Q1, Q2) 72, 74. Input terminals 110 of the first isolated DC-DC converter 92 are connected across the second resistor (R2) 90 of the first voltage sensing and power supply circuit 80. Output terminals 112 of the first isolated DC-DC converter 92 are connected between the source 100 and the gate 104 of the first JFET (Q1) 72 through a blocking diode (D3) 114. Input terminals 116 of the second isolated DC-DC converter 94 are connected across the second resistor (R4) 118 of the second voltage sensing and power supply circuit 82. Output terminals 120 of the second isolated DC-DC converter 94 are connected between the source 102 and the gate 106 of the second JFET (Q2) 74 through a blocking diode (D4) 122. The bidirectional SSCB 70 is preferably used in a DC power system with the source 102 of the second JFET (Q2) 74 connected to a power supply, and the source 100 of the first JFET (Q1) 72 connected to a load element. When the common-drain, normally-on JFETs (Q1, Q2) 72, 74 conduct a normal load current, a voltage drop across the series-connected JFETs (Q1, Q2) 72, 74 is very small. A voltage across the second resistor (R2) 90 is also very small. Both input and output voltages of the first isolated DC/DC converter 92 are also negligible. Therefore, there is no reverse biasing voltage applied between the gate 104 and the source 100 of the first JFET (Q1) 72. The first JFET (Q1) 72 remains in the on state. When the load is shorted, a voltage drop across the series-connected JFETs (Q1, Q2) 72, 74 increases rapidly, causing a large voltage built across the second resistor (R2) 90 and leading to a large reverse biasing voltage, typically 10-40 volts, between the gate 104 and the source 100 of the first JFET (Q1) 72. The normally-on JFET (Q1) 72 will turn off and block currents from the power supply with a large negative gate-source biasing voltage, and thus provide protection against short circuit faults. Due to the symmetrical construction of the bidirectional SSBC 70, the device provides protection against short circuit faults when the power source and load are swapped.

Figure 4:
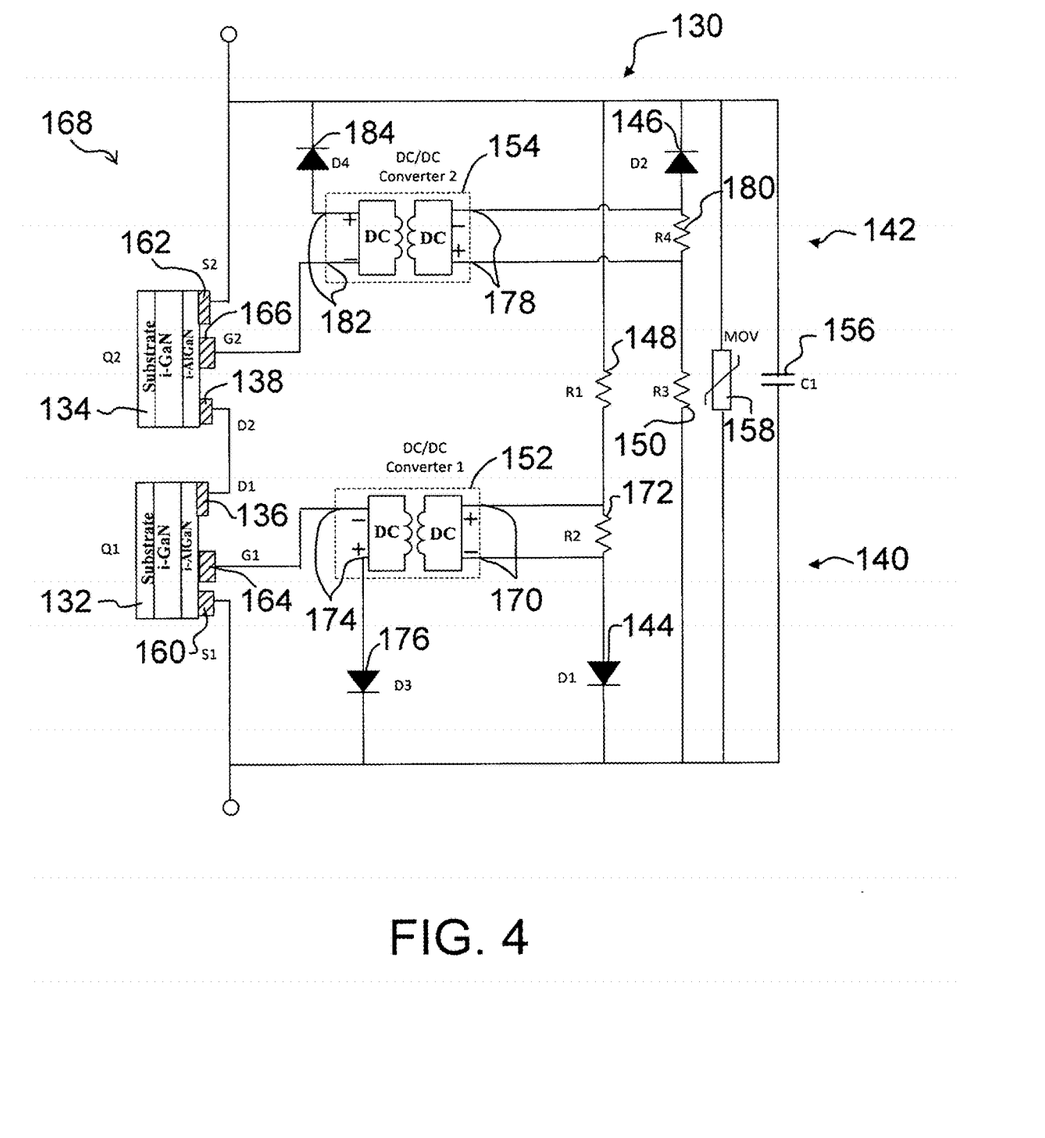
FIG. 4 shows a bidirectional solid-state circuit breaker using a plurality of asymmetrical normally-on GaN HEMTs with drain terminals connected according to an embodiment of this invention.

FIG. 4 illustrates an embodiment of bidirectional solid-state circuit breaker 130 using two asymmetrical normally-on GaN HEMTs 132, 134 with their drain terminals 136, 138 connected together. The bidirectional SSCB 130 comprises a first asymmetrical normally-on HEMT (Q1) 132 and a second asymmetrical normally-on HEMT (Q2) 134, a first voltage sensing and power supply circuit 140, a second voltage sensing and power supply circuit 142. Each of the voltage sensing and power supply circuits 140, 142 including a blocking diode 144, 146 and a first resistor 148, 150 and second resistor 172, 180. The voltage sensing and power supply circuits 140, 142 include a first isolated DC-DC converter 152 and a second isolated DC-DC converter 154, respectively. The first and second voltage sensing and power supply circuits 140, 142 are connected to a capacitor (C1) 156 and a metal-oxide varistor (MOV) 158. Each of the two HEMTs has a drain 136, 138, a source 160, 162, and a gate terminal 164, 166. The drain terminals 136, 138 of the first HEMT (Q1) 132 and the second HEMT (Q2) 134 are connected together to form a bidirectional switch 168 with a main current flowing from the source 162 of the second HEMT (Q2) 134 to the source 160 of the first HEMT (Q1) 132 or vice versa. The two voltage sensing and power supply circuits 140, 142, the capacitor (C1) 156, and the MOV 158 are connected between the source terminals 160, 162 of the asymmetrical normally-on HEMTs (Q1, Q2) 132, 134. Input terminals 170 of the first isolated DC-DC converter 152 are connected across a second resistor (R2) 172 of the first voltage sensing and power supply circuit 140. Output terminals 174 of the first isolated DC-DC converter 152 are connected between the source 160 and the gate 164 of the first asymmetrical normally-on HEMT (Q1) 132 through a blocking diode (D3) 176. Input terminals 178 of the second isolated DC-DC converter 154 are connected across a second resistor (R4) 180 of the second voltage sensing and power supply circuit 142. Output terminals 182 of the second isolated DC-DC converter 154 are connected between the source 162 and the gate 166 of the second HEMT (Q2) 134 through a blocking diode (D4) 184. The bidirectional SSCB 130 is preferably used in a DC power system with the source 162 of the second HEMT (Q2) 134 connected to a power supply (not shown), and the source 160 of the first HEMT (Q1) 132 connected to a load element (not shown). When the common-drain, normally-on HEMTs (Q1, Q2) 132, 134 conduct a normal load current, a voltage drop across the series-connected HEMTs (Q1, Q2) 132, 134 is very small. The voltage across the resistor (R2) 172 is also very small. Both input and output voltages of the first isolated DC/DC converter 152 are also negligible. Therefore there is no reverse biasing voltage applied between the gate 164 and the source 160 of the HEMT (Q1) 132. The HEMT (Q1) 132 remains in the on state. When a load is accidentally shorted, a voltage drop across the series-connected HEMTs (Q1, Q2) 132, 134 increases rapidly, causing a large voltage built across the second resistor (R2) 172 and leading to a large reverse biasing voltage between the gate 164 and the source 160 of the first HEMT (Q1) 132. The normally-on HEMT (Q1) 132 will turn off and block currents from the power supply with a large negative gate-source biasing voltage, and thus provide protection against short circuit faults. Due to the symmetrical construction of the bidirectional SSBC 130, the device can provide protection against short circuit faults when the power source and load are swapped.

Figure 5:
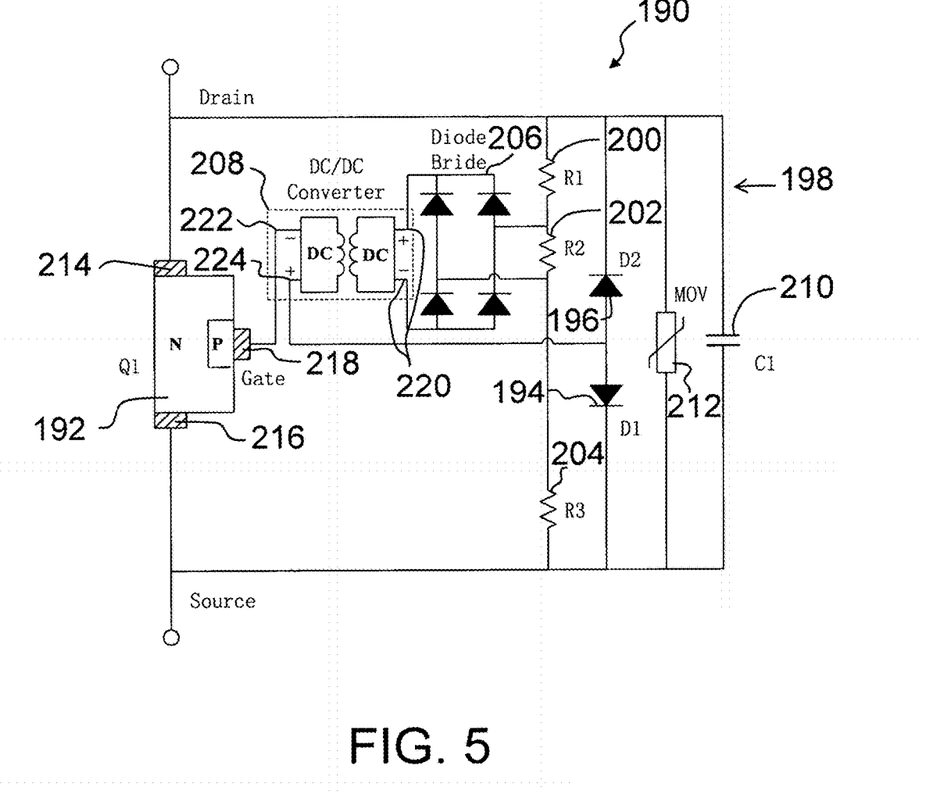
FIG. 5 shows a bidirectional solid-state circuit breaker including a symmetrical normally-on JFET with a single gate electrode according to an embodiment of this invention.

FIG. 5 illustrates an embodiment of bidirectional solid-state circuit breaker 190 using one symmetrical normally-on JFET with a single gate electrode 192. The bidirectional SSCB 190 comprises the symmetrical normally-on JFET (Q1) 192, a first blocking diode (D1) 194 and a second blocking diode (D2) 196, a voltage sensing and power supply circuit 198 including a first resistor (R1) 200, a second resistor (R2) 202 and a third resistor (R3) 204, a diode bridge 206, an isolated DC-DC converter 208, a capacitor (C1) 210, and a metal-oxide varistor (MOV) 212. The symmetrical JFET (Q1) 192 includes a drain 214, a source 216, and a gate region 218 with a main current flowing between the source 216 and the drain 214 of the symmetrical JFET (Q1) 192. The voltage sensing and power supply circuit 198, the capacitor (C1) 210, and the MOV 212 are connected between the source 216 and the drain 214 of the symmetrical JFET (Q1) 192. Input terminals 220 of the isolated DC-DC converter 208 are connected across the second resister (R2) 202 of the voltage sensing and power supply circuit 198 through the diode bridge 206. A negative output terminal 222 of the isolated DC-DC converter 208 connects to the gate 218 of the symmetrical JFET (Q1) 192. A positive output terminal 224 of the isolated DC-DC converter 208 connects to a common anode of the blocking diodes D1 and D2 194, 196. A cathode of the first blocking diode (D1) 194 is connected to the source 216 of the symmetrical JFET (Q1) 192. A cathode of the second diode (D2) 196 is connected to the drain 214 of the symmetrical JFET (Q1) 192. The bidirectional SSCB 190 is preferably used in a DC power system with the drain 214 of the symmetrical JFET (Q1) 192 connected to the power supply, and the source 216 of the symmetrical JFET (Q1) 192 connected to a load element. When the normally-on JFET (Q1) 192 conducts a normal load current from the drain 214 to the source 216, a voltage drop across the normally-on JFET (Q1) 192 is very small. A voltage across the second resistor (R2) 202 is also very small. Both input and output voltages of the isolated DC/DC converter 208 are also negligible. Therefore there is not enough voltage to forward bias either the first diode (D1) 194 and/or the second diode (D2) 196. The gate 218 of the normally-on JFET (Q1) 192 is essentially floating and the normally-on JFET (Q1) 192 remains in the on state. When the load is accidentally shorted to ground, the drain-source voltage across the normally-on JFET (Q1) 192 increases rapidly, causing a large voltage drop across the second resistor (R2) 202 and leading to a large output voltage of the isolated DC/DC converter 208. Since the drain voltage is still greater than the source voltage in case, the first diode (D1) 194 is forward biased and the second diode (D2) 196 is reverse biased. The large output voltage, typically 10-40 volts, of the isolated DC/DC converter 208 is now applied between the source 216 and the gate 218 of the normally-on JFET (Q1) 192. The normally-on JFET (Q1) 192 will turn off and block currents from the power supply with a large negative gate-source biasing voltage, and thus provide protection against short circuit faults. Due to the symmetrical construction of the bidirectional SSBC 190, the device can provide protection against short circuit faults when the power source and load are swapped.

Figure 6:
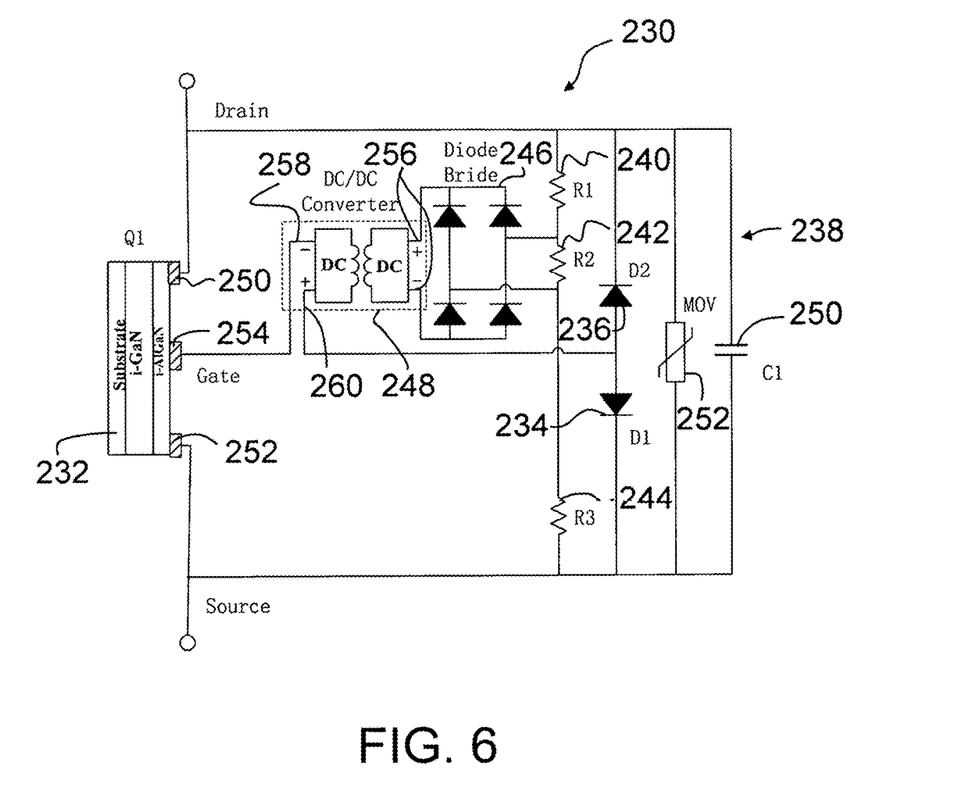
FIG. 6 shows a bidirectional solid-state circuit breaker including a symmetrical normally-on GaN HEMT with a single gate electrode according to an embodiment of this invention.

FIG. 6 illustrates an embodiment of bidirectional solid-state circuit breaker 130 using one symmetrical normally-on GaN HEMT with a single gate electrode 232. The bidirectional SSCB 230 comprises a symmetrical normally-on HEMT 232 (Q1), a first blocking diode (D1) 234, a second blocking diode (D2) 236, a voltage sensing and power supply circuit 238 having a first resister (R1) 240, a second resistor (R2) 242 and a third resistor (R3) 244, a diode bridge 246, an isolated DC-DC converter 248, a capacitor (C1) 250, and a metal-oxide varistor (MOV) 252. The symmetrical HEMT (Q1) 232 includes a drain 250, a source 252, and a gate region 254 with a main current flowing between the drain 250 and the source 252 of the symmetrical HEMT (Q1) 232. The difference between the symmetrical HEMT (Q1) 232 and a conventional HEMT is that the symmetrical HEMT 232 has a long drift region on both the drain 250 and the source 252 side to support a high blocking voltage in either direction. The voltage sensing and power supply circuit 238, the capacitor (C1) 250, and the MOV 252 are connected between the source 252 and the drain 250 of the symmetrical HEMT (Q1) 232. Input terminals 256 of the isolated DC-DC converter 248 are connected across the second resistor (R2) 242 of the voltage sensing and power supply circuit 238 through the diode bridge 246. A negative output terminal 258 of the isolated DC-DC converter 248 is connected to the gate 254 of the symmetrical HEMT (Q1) 232. A positive output terminal 260 of the isolated DC-DC converter 248 is connected to a common anode of the blocking diodes (D1, D2) 234, 236. A cathode of the first blocking diode (D1) 234 is connected to the source 252 of the symmetrical HEMT (Q1) 232. A cathode of the second blocking diode (D2) 236 is connected to the drain 250 of the symmetrical HEMT (Q1) 232. The bidirectional SSCB 230 is preferably used in a DC power system with the drain 250 of the symmetrical HEMT (Q1) 232 connected to the power supply, and the source 252 of the symmetrical HEMT (Q1) 232 connected to a load element. When the symmetrical HEMT (Q1) 232 conducts a normal load current from the drain 250 to the source 252, the voltage drop across the symmetrical HEMT (Q1) 232 is very small. The voltage across the second resistor (R2) 242 is also very small. Both the input and output voltages of the isolated DC/DC converter 248 are also negligible. Therefore there is not enough voltage to forward bias either the first diode (D1) 234 or the second diode (D2) 236. The gate 254 of the symmetrical HEMT (Q1) 232 is essentially floating and the symmetrical HEMT (Q1) 232 remains in the on state. When the load is accidentally shorted, the drain-source voltage across the symmetrical HEMT (Q1) 232 increases rapidly, causing a large voltage drop across the second resistor (R2) 242 and leading to a large output voltage of the isolated DC/DC converter 248. Since the drain voltage is still greater than the source voltage in case, D1 is forward biased and D2 is reverse biased. The large output voltage of the isolated DC/DC converter 248 is now applied between the source 252 and the gate 254 of the symmetrical HEMT (Q1) 232. The normally-on HEMT (Q1) 232 will turn off and block currents from the power supply with a large negative gate-source biasing voltage, and thus provide protection against short circuit faults. Due to the symmetrical construction of the bidirectional SSBC 230, the device can provide protection against short circuit faults when the power source and load are swapped.

Figure 7:
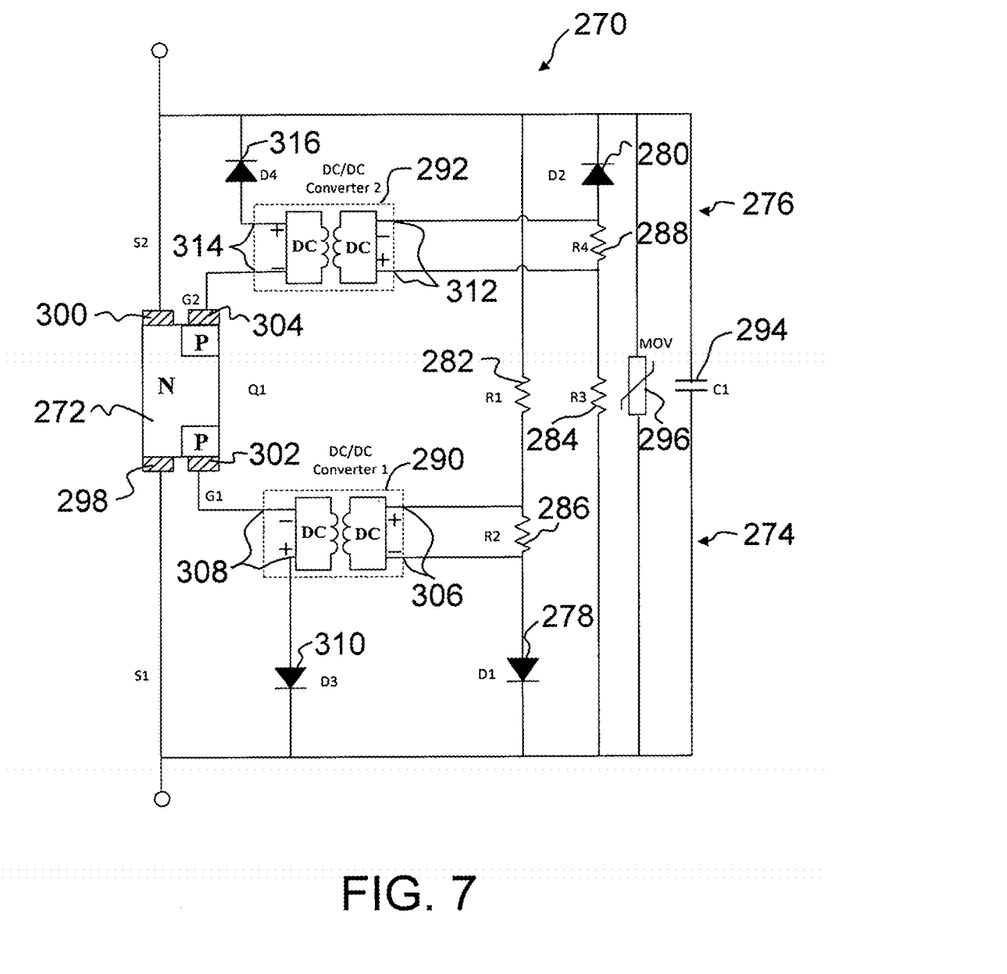
FIG. 7 shows a bidirectional solid-state circuit breaker including one symmetrical normally-on four-terminal JFET with two separate gate electrodes according to an embodiment of this invention.

FIG. 7 illustrates an embodiment of bidirectional solid-state circuit breaker 270 using asymmetrical normally-on four-terminal JFET switch with two separate gate electrodes 272. The bidirectional SSCB 270 comprising the symmetrical four-terminal normally-on switch (Q1) 272, a first and second voltage sensing and power supply circuits 274, 276 each including a blocking diode 278, 280, a first resistor 282, 284 and a second resistor 286, 288. The bidirectional SSCB 270 further including a first and second isolated DC-DC converters 290, 292, a capacitor (C1) 294, and a metal-oxide varistor (MOV) 296. The symmetrical four-terminal normally-on switch (Q1) 272 has a first source (S1) 298, a second source (S2) 300, a first gate (G1) 302, and a second gate (G2) 304 terminals. A main current between a power bus and a load flows from the first source (S1) 298 to the second source (S2) 399 of the symmetrical four-terminal normally-on switch (Q1) 272 or vice versa. The two voltage sensing and power supply circuits 274, 276, the capacitor (C1) 294, and the MOV 296 are connected between the source terminals 298, 300 of the symmetrical four-terminal normally-on switch (Q1) 272. Input terminals 306 of the first isolated DC-DC converter 290 are connected across the second resistor (R2) 286 of the first voltage sensing and power supply circuit 274. Output terminals 308 of the first isolated DC-DC converter 290 are connected between the first source (S1) 298 and the first gate (G1) 302 of the symmetrical four-terminal normally-on switch (Q1) 272 through a blocking diode (D3) 310. Input terminals of the second isolated DC-DC converter 312 are connected across the second resistor (R4) 288 of the second voltage sensing and power supply circuit 276. Output terminals 314 of the second isolated DC-DC converter 292 are connected between the second source (S2) 300 and the second gate (G2) 304 of the symmetrical four-terminal normally-on switch (Q1) 272 through a blocking diode (D4) 316. The bidirectional SSCB 270 is preferably used in a DC power system with the second source (S2) 300 of the symmetrical four-terminal normally-on switch (Q1) 272 connected to a power supply, and the first source (S1) 298 of the symmetrical four-terminal normally-on switch (Q1) 272 connected to a load element. When the symmetrical four-terminal normally-on switch (Q1) 272 conducts a normal load current, a voltage drop between the second source (S2) 300 and the first source (S1) 298 of the symmetrical four-terminal normally-on switch (Q1) 272 is very small. The voltage across the second resistor (R2) 286 is also very small. Both the input and output voltages of the first isolated DC/DC converter 290 are also negligible. Therefore there is no reverse biasing voltage applied between the first gate (G1) 302 and the first source (S1) 298 of the symmetrical four-terminal normally-on switch (Q1) 272. The symmetrical four-terminal normally-on switch (Q1) 272 remains in an on state. When the load is shorted, a voltage drop between the second source (S2) 300 and the first source (S1) 298 of the symmetrical four-terminal normally-on switch (Q1) 272 increases rapidly, causing a large voltage across the second resistor (R2) 286 and leading to a large reverse biasing voltage, typically 10-40 volts, between the first gate (G1) 302 and the first source (S1) 298 of the symmetrical four-terminal normally-on switch (Q1) 272. The normally-on switch (Q1) 272 will turn off and block currents from the power supply with a large negative gate-source biasing voltage, and thus provide protection against short circuit faults. Due to the symmetrical construction of the bidirectional SSBC, the device can provide protection against short circuit faults when the power source and load are swapped.

Figure 8:
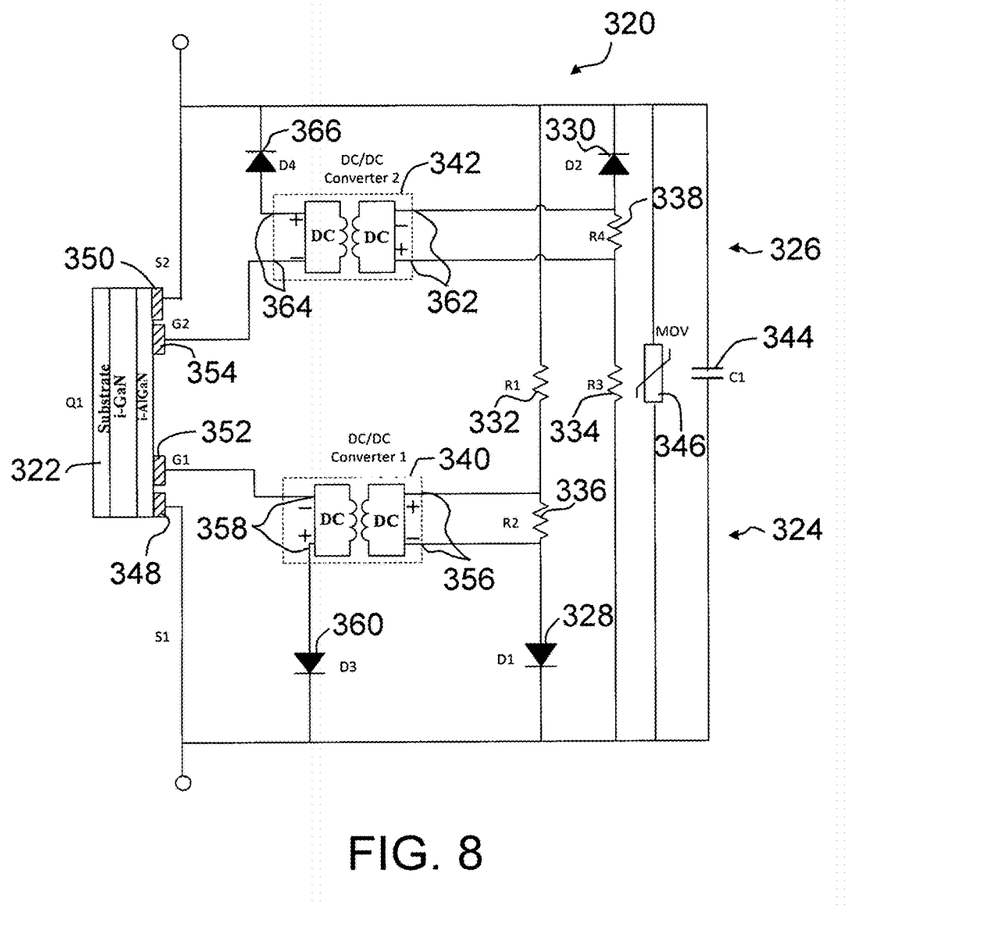
FIG. 8 shows a bidirectional solid-state circuit breaker using one symmetrical normally-on four-terminal GaN HEMT with two separate gate electrodes according to an embodiment of this invention.

FIG. 8 illustrates an embodiment of bidirectional solid-state circuit breaker 320 using one symmetrical normally-on four-terminal GaN HEMT switch with two separate gate electrodes 322. The bidirectional SSCB 320 comprising the symmetrical four-terminal normally-on GaN HEMT switch (Q1) 322, a first voltage sensing and power supply circuit 324 and a second voltage sensing and power supply circuit 326 each of the voltage sensing and power supply circuits including a blocking diode 328, 330, a first resistor 332, 334 and a second resistor 336, 338, and an isolated DC-DC converter 340, 342. The bidirectional SSCB 320 further includes a capacitor (C1) 344 and a metal-oxide varistor (MOV) 346. The symmetrical four-terminal normally-on GaN HEMT switch (Q1) 322 includes a first source (S1) 348, a second source (S2) 350, a first gate (G1) 352, and a second gate (G2) 354 terminals. A main current between a power bus and a load flows from the first source (S1) 348 to the second source (S2) 350 of the symmetrical four-terminal normally-on GaN HEMT switch (Q1) 322 or vice versa. The two voltage sensing and power supply circuits 324, 326, the capacitor (C1) 344, and the MOV 346 are connected between the source terminals 348, 350 of the symmetrical four-terminal normally-on GaN HEMT switch (Q1) 322. Input terminals 356 of the first isolated DC-DC converter 340 are connected across the second resistor (R2) 336 of the first voltage sensing and power supply circuit 324. Output terminals 358 of the first isolated DC-DC converter 340 are connected between the first source (S1) 348 and the first gate (G1) 352 of the symmetrical four-terminal normally-on GaN HEMT switch (Q1) 322 through a blocking diode (D3) 360. Input terminals 362 of the second isolated DC-DC converter 342 are connected across the second resistor (R4) 338 of the second voltage sensing and power supply circuit 326. Output terminals 364 of the second isolated DC-DC converter 342 are connected between the second source (S2) 350 and second gate (G2) 354 of the symmetrical four-terminal switch (Q1) 322 through a blocking diode (D4) 366. The bidirectional SSCB 320 is preferably used in a DC power system with the second source (S2) 350 of the symmetrical four-terminal switch (Q1) 322 connected to a power supply, and the first source (S1) 348 of the symmetrical four-terminal switch (Q1) 322 connected to a load element. When the symmetrical four-terminal switch (Q1) 322 conducts a normal load current, the voltage drop between the second source (S2) 350 and the first source (S1) 348 of the symmetrical four-terminal switch (Q1) 322 is very small. The voltage across the second resistor (R2) 336 is also very small. Both the input and output voltages of the first isolated DC/DC converter 340 are also negligible. Therefore there is no reverse biasing voltage applied between the first gate (G1) 352 and the first source (S1) 348 of the symmetrical four-terminal switch (Q1) 322. The symmetrical four-terminal switch (Q1) 322 remains in the on state. When the load is shorted, a voltage drop between the second source (S2) 350 and the first source (S1) 348 of the symmetrical four-terminal switch (Q1) 322 increases rapidly, causing a large voltage built across the second resistor (R2) 336 and leading to a large reverse biasing voltage between the first gate (G1) 352 and the first source (S1) 348 of the symmetrical four-terminal switch (Q1) 322. The normally-on switch Q1 will turn off and block currents from the power supply with a large negative gate-source biasing voltage, and thus provide protection against short circuit faults. Due to the symmetrical construction of the bidirectional SSBC 320, the device can provide protection against short circuit faults when the power source and load are swapped.

Figure 9:
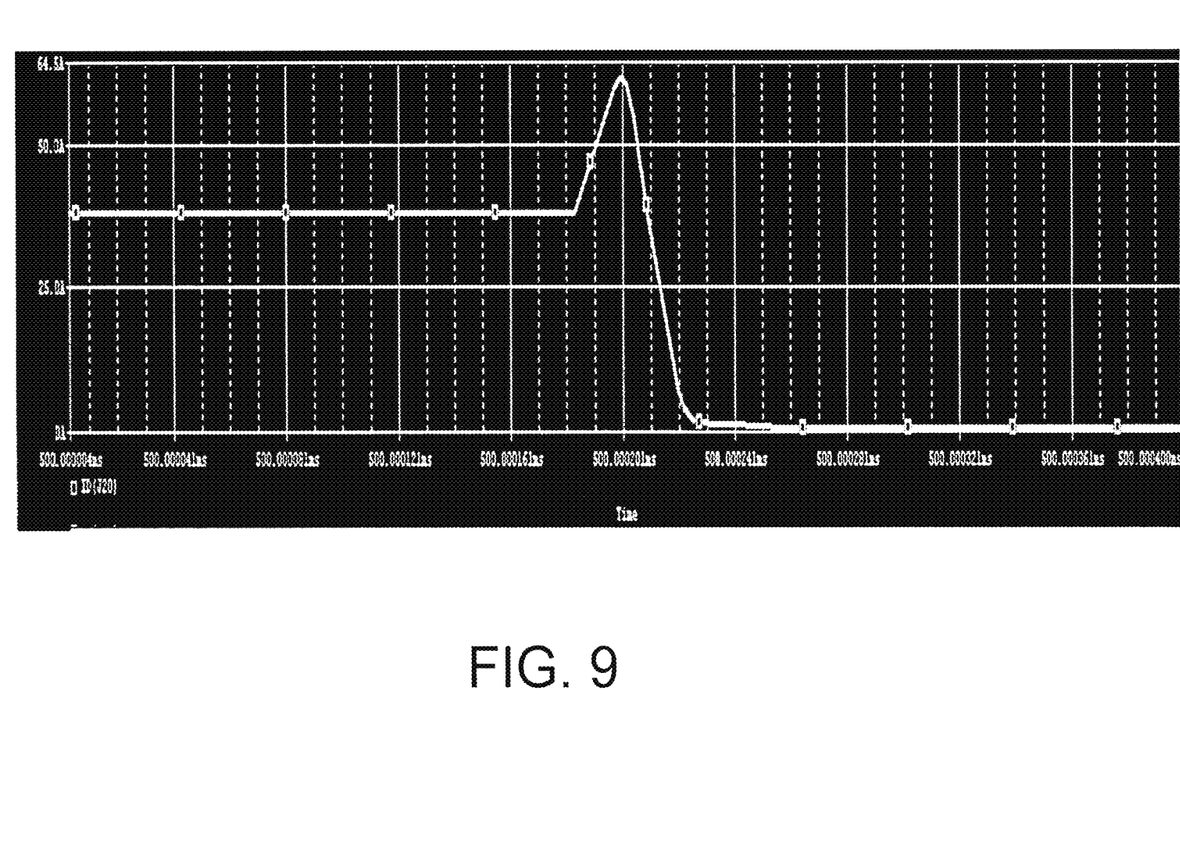
FIG. 9 shows a waveform of the current flowing through one embodiment of a solid-state circuit breaker of this invention during a short circuit fault event.

A current simulation was performed to prove the concept of the invention. FIG. 9 shows a waveform of a current through an embodiment of a solid-state circuit breaker of this invention during a short circuit fault event. The solid-state circuit breaker initially conducts a normal current of 40 amperes. When a load is shorted, the solid-state circuit breaker current rises to 64 amperes but then falls to zero when the auxiliary circuit reacts.

Thus, the invention provides a solid-state circuit breaker device in DC power systems. The invention further provides a circuit breaker with a self-powered auxiliary circuit that interrupts fault current in the event of a short circuit in DC power systems.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A solid-state DC circuit breaker comprising:
 a source and a drain, wherein the drain is connectable to a power supply and the source is connectable to a load;
 a solid-state static switch including a drain terminal, a source terminal and a gate terminal, the drain terminal connected to the drain and the source terminal connected to the source;
 a voltage sensing and power supply circuit connected across the drain and the source and comprising a voltage sensing element and an isolated DC-DC converter including input terminals and output terminals;
 wherein the input terminals of the isolated DC-DC converter are connected across the voltage sensing element of the voltage sensing and power supply circuit;
 wherein the output terminals of the isolated DC-DC converter are connected between the source and the gate terminal of the solid-state switch; and
 wherein when the load is shorted, the voltage between the drain terminal and the source terminal of the solid-state switch increases rapidly causing a large voltage across the voltage sensing element and a large reverse biasing voltage between the gate terminal and the source terminal causing the solid-state switch to turn off and block current from the power supply.

2. The solid-state DC circuit breaker of claim 1, wherein the voltage sensing and power supply circuit further comprises a capacitor and a metal-oxide varistor (MOV), wherein the capacitor and the varistor are connected between the drain and the source.

3. The solid-state DC circuit breaker of claim 1, wherein when the load is not shorted the solid-state switch conducts a normal load current from the drain to the source.

4. The solid-state DC circuit breaker of claim 1, wherein the solid-state switch comprises one of a Junction Field Effect Transistor (JFET) and a High Electron Mobility Transistor (HEMT).

5. The solid-state DC circuit breaker of claim 4, wherein the JFET comprises a normally-on asymmetric semiconductor JFET.

6. The solid-state DC circuit breaker of claim 4, wherein the HEMT comprises an asymmetrical normally-on gallium nitride HEMT.

7. A solid-state DC circuit breaker comprising:
 a first connector and a second connector for bi-directional connection of the solid-state DC circuit breaker;
 a first solid-state switch connected in series with a second solid-state switch, wherein the first solid-state switch includes a first switch drain terminal, a first switch source terminal and a first switch gate terminal and the second solid-state switch includes a second switch drain terminal, a second switch source terminal and a second switch gate terminal, and wherein the first switch drain terminal is connected to the second switch drain terminal and the first switch source terminal connected the first connector and the second switch source terminal connected to the second connector;
 a first voltage sensing and power supply circuit connected across the first connector and the second connector comprising a first voltage sensing element, and a first isolated DC-DC converter including input terminals and output terminals;
 a second voltage sensing and power supply circuit connected across the first connector and the second connector comprising a second voltage sensing element, and a second isolated DC-DC converter including input terminals and output terminals;
 wherein the input terminals of the first DC-DC converter are connected across the first voltage sensing element of the first voltage sensing and power supply circuit;
 wherein the output terminals of the first DC-DC converter are connected between the first switch source terminal and the first switch gate terminal of the first solid-state switch;
 wherein the input terminals of the second DC-DC converter are connected across the second voltage sensing element of the second voltage sensing and power supply circuit;
 wherein the output terminals of the second DC-DC converter are connected between the second switch source terminal and the second switch gate terminal of the second solid-state switch; and
 wherein when a load is shorted a voltage between the first connector and the second conductor increases rapidly causing a large voltage across one of the first voltage sensing element and the second voltage sensing element causing one of the first solid-state switch or the second solid-state switch to turn off and block current.

8. The solid-state DC circuit breaker of claim 7, further comprising:
 a capacitor and a metal-oxide varistor (MOV), wherein the capacitor and the varistor are connected between the first connector and the second connector.

9. The solid-state DC circuit breaker of claim 7, wherein when the load is not shorted the first solid-state switch and the second solid-state switch conduct a normal load current from the first connector to the second connector.

10. The solid-state DC circuit breaker of claim 7, wherein each of the first solid-state switch and the second solid-state switch comprise one of a Junction Field Effect Transistor (JFET) and a High Electron Mobility Transistor (HEMT).

11. A solid-state DC circuit breaker comprising:
 a source and a drain, wherein the solid-state DC circuit breaker is capable of bi-directional operation;
 a voltage sensing and power supply circuit connected across the drain and the source and comprising a voltage sensing element and an isolated DC-DC converter including input terminals, a positive output terminal and a negative output terminal;
 a solid-state symmetrical switch including a drain terminal, a source terminal and a gate terminal, the drain terminal connected to the drain and the source terminal connected to the source;
 wherein the input terminals of the DC-DC converter are connected across the voltage sensing element of the voltage sensing and power supply circuit through a diode bridge;

wherein the negative output terminal of the DC-DC converter connected to the gate terminal of the solid-state symmetrical switch and the positive output terminal of the DC-DC converter connects to a common anode of a first blocking diode and a second blocking diode and a cathode of the first blocking diode connects to the source and a cathode of the second blocking diode connects to the drain; and wherein when a load is shorted the voltage between the drain terminal and the source terminal of the solid-state asymmetrical switch increases rapidly causing a large voltage across the voltage sensing element and a large reverse biasing voltage between the gate terminal and one of the source terminal and the drain terminal causing the solid-state symmetrical switch to turn off and block current from a power supply.

12. The solid-state DC circuit breaker of claim 11, wherein the voltage sensing and power supply circuit further comprises a capacitor and a metal-oxide varistor (MOV), wherein the capacitor and the varistor are connected between the drain and the source.

13. The solid-state DC circuit breaker of claim 11, wherein when the load is not shorted the solid-state symmetrical switch conducts a normal load current.

14. The solid-state DC circuit breaker of claim 11, wherein the solid-state symmetrical switch comprises one of a symmetrical normally-on Junction Field Effect Transistor (JFET) and a symmetrical normally-on GaN High Electron Mobility Transistor (HEMT).

15. A solid-state DC circuit breaker comprising:
a first connector and a second connector for bi-directional connection of the solid-state DC circuit breaker to a circuit;
a voltage sensing and power supply circuit connected across the first connector and the second connector comprising a first voltage sensing element, a second voltage sensing element, a first isolated DC-DC converter including input terminals and output terminals, and a second DC-DC converter including input terminals and output terminals;
a solid-state switch including a first source terminal, a second source terminal, a first gate terminal, and a second gate terminal, and wherein the first source terminal is connected to the first connector and the second source terminal is connected to the second connector;
wherein the input terminals of the first DC-DC converter are connected across the first voltage sensing element of the voltage sensing and power supply circuit, wherein the output terminals of the first DC-DC converter are connected between the first source connector and the first gate terminal; and
wherein the input terminals of the second DC-DC converter are connected across the second voltage sensing element of the voltage sensing and power supply circuit, wherein the output terminals of the second DC-DC converter are connected between the second connector and the second gate terminal; and
wherein when a load is shorted the voltage between the first connector and the second connector of the solid-state switch increases rapidly causing a large voltage across one of the first voltage sensing element and the second voltage sensing element and a large reverse biasing voltage between one of the first gate terminal and the first source terminal or the second gate terminal and the second source terminal causing the solid-state switch to turn off and block current from a power supply.

16. The solid-state DC circuit breaker of claim 15, wherein the voltage sensing and power supply circuit further comprises a capacitor and a metal-oxide varistor (MOV), wherein the capacitor and the varistor are connected between the first connector and the second connector.

17. The solid-state DC circuit breaker of claim 15, wherein the solid-state switch comprises a four-terminal Junction Field Effect Transistor (JFET).

18. The solid-state DC circuit breaker of claim 15, wherein the solid-state switch comprises a four terminal High Electron Mobility Transistor (HEMT).

* * * * *